United States Patent
Matsui

(10) Patent No.: US 9,871,590 B2
(45) Date of Patent: Jan. 16, 2018

(54) OPTICAL TRANSCEIVER IMPLEMENTING ERBIUM DOPED FIBER AMPLIFIER

(71) Applicant: Sumitomo Electric Industries, Ltd., Osaka-shi (JP)

(72) Inventor: Takashi Matsui, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/878,744

(22) Filed: Oct. 8, 2015

(65) Prior Publication Data

US 2016/0103286 A1    Apr. 14, 2016

Related U.S. Application Data

(60) Provisional application No. 62/062,576, filed on Oct. 10, 2014.

(51) Int. Cl.
*H04B 10/00* (2013.01)
*H04J 14/02* (2006.01)
(Continued)

(52) U.S. Cl.
CPC ....... *H04B 10/2503* (2013.01); *G02B 6/2843* (2013.01); *G02B 6/3812* (2013.01);
(Continued)

(58) Field of Classification Search
CPC .... H04B 10/2503; H04B 10/40; H04B 10/50; H04B 10/60; H04B 10/614; H04B 10/6151; H04B 10/64; H04B 10/63; H04B 10/00; H04B 10/12; H04B 10/2918; G02B 6/2843; G02B 6/3812; G02B 6/4216; G02B 6/4246; G02B 6/43; G02B 6/2773; G02B 6/3823; G02B 6/4245; G02B 6/4256;
(Continued)

(56) References Cited

U.S. PATENT DOCUMENTS 7,031,051 B2 * 4/2006 Liu ............... H01S 3/06758
                                                359/341.2
7,209,664 B1 * 4/2007 McNicol ............ H04B 10/50
                                                375/219
(Continued)

FOREIGN PATENT DOCUMENTS

JP    2000022379 A  * 1/2000  ............. H05K 9/00
JP    2015-091004 A    5/2015

OTHER PUBLICATIONS

Jon Anderson, CFP MSA CFP2 Harware Specification Draft Revision 0.3, May 2, 2013.*
(Continued)

*Primary Examiner* — Ken N Vanderpuye
*Assistant Examiner* — Abbas H Alagheband
(74) *Attorney, Agent, or Firm* — Venable LLP; Michael A. Sartori; Laura G. Remus

(57) ABSTRACT

An optical transceiver that installs an optical modulator with the Mach-Zehnder type and made of primarily semiconductor materials, and an Erbium Doped Fiber Amplifier (EDFA) is disclosed. The EDFA and the MZ modulator, in addition to a wavelength tunable laser diode, an intelligent coherent receiver, and a polarization maintaining splitter, are installed within a compact case following the standard of CFP2.

12 Claims, 17 Drawing Sheets

(51) Int. Cl.
*H04B 17/00* (2015.01)
*H04B 10/25* (2013.01)
*G02B 6/43* (2006.01)
*G02B 6/42* (2006.01)
*H04B 10/40* (2013.01)
*G02B 6/38* (2006.01)
*G02B 6/28* (2006.01)
*H01S 3/067* (2006.01)
*H04B 10/60* (2013.01)
*G02B 6/27* (2006.01)
*H01S 3/16* (2006.01)

(52) U.S. Cl.
CPC ......... *G02B 6/4216* (2013.01); *G02B 6/4246* (2013.01); *G02B 6/43* (2013.01); *H01S 3/06704* (2013.01); *H01S 3/06754* (2013.01); *H04B 10/40* (2013.01); *G02B 6/2773* (2013.01); *G02B 6/3823* (2013.01); *G02B 6/4245* (2013.01); *G02B 6/4256* (2013.01); *G02B 6/4292* (2013.01); *H01S 3/1608* (2013.01); *H04B 10/60* (2013.01); *H04J 14/0247* (2013.01)

(58) Field of Classification Search
CPC ...... G02B 6/4292; G02B 6/42; G02B 6/4284; H01S 3/06754; H01S 3/091; H04J 14/02; H04J 14/06; H04J 14/00; H04J 14/0224; H04J 14/0247; G01C 19/728; G01C 19/725; G01C 19/72
See application file for complete search history.

(56) References Cited

U.S. PATENT DOCUMENTS

| | | | | |
|---|---|---|---|---|
| 7,526,211 B2* | 4/2009 | Mcnicol | ............... | H04B 10/50 398/128 |
| 7,535,005 B2* | 5/2009 | Demers | ................... | G01J 3/42 250/341.1 |
| 7,545,868 B2* | 6/2009 | Kennedy | ............. | H04B 1/7163 375/222 |
| 8,666,257 B2* | 3/2014 | Daghighian | ........... | H04B 10/40 398/130 |
| 8,798,476 B2* | 8/2014 | Gloeckner | ......... | H04B 10/2587 398/140 |
| 8,929,744 B2* | 1/2015 | El-Ahmadi | ........... | H04L 1/0057 398/135 |
| 9,052,477 B2* | 6/2015 | Oki | ..................... | G02B 6/4201 |
| 9,191,117 B2* | 11/2015 | Alexander | ............. | H04B 10/29 |
| 9,264,147 B2* | 2/2016 | Caplan | ................ | H04B 10/5561 |
| 9,319,142 B2* | 4/2016 | Kato | ..................... | G02B 6/4213 |
| 2002/0063920 A1* | 5/2002 | Morita | ................. | H04B 10/505 398/65 |
| 2002/0186952 A1* | 12/2002 | Gao | ...................... | G02B 6/4459 385/134 |
| 2003/0072060 A1* | 4/2003 | Sourani | ................. | H04B 10/60 398/121 |
| 2006/0093143 A1* | 5/2006 | Maeda | ................. | H04L 9/0852 380/256 |
| 2007/0154221 A1* | 7/2007 | McNicol | ............... | H04B 10/50 398/135 |
| 2008/0179527 A1* | 7/2008 | Demers | .................... | G01J 3/42 250/341.1 |
| 2011/0103797 A1* | 5/2011 | Oki | ..................... | G02B 6/4201 398/79 |
| 2012/0087613 A1* | 4/2012 | Rasras | ................. | G02F 1/0147 385/1 |
| 2012/0237171 A1* | 9/2012 | Oki | ..................... | G02B 6/4201 385/78 |
| 2013/0177309 A1* | 7/2013 | El-Ahmadi | ........... | H04L 1/0057 398/25 |
| 2014/0010551 A1* | 1/2014 | Kurashima | ............ | H04B 10/40 398/135 |
| 2014/0023359 A1* | 1/2014 | Tsubouchi | ......... | H04B 10/0799 398/24 |
| 2014/0205285 A1* | 7/2014 | Jiang | ....................... | H04Q 1/00 398/45 |
| 2014/0219658 A1* | 8/2014 | Xia | ........................ | H04J 14/06 398/65 |
| 2015/0104177 A1* | 4/2015 | Kato | ...................... | H04B 10/40 398/79 |
| 2015/0109605 A1* | 4/2015 | Major, Jr. | ............. | G01S 7/4811 356/28 |
| 2015/0110136 A1* | 4/2015 | Schusslbauer | ...... | H01S 3/06704 372/6 |
| 2015/0124313 A1* | 5/2015 | Takahashi | ........... | H01S 3/06754 359/337 |
| 2015/0311976 A1* | 10/2015 | Ishizaka | ............. | H04B 10/2503 398/38 |

OTHER PUBLICATIONS

"CFP MSA CFP2 Hardware Specification" Draft Revision 0.3, from url <http://www.cfp-msa.org/documents.html> dated May 2, 2013.

* cited by examiner

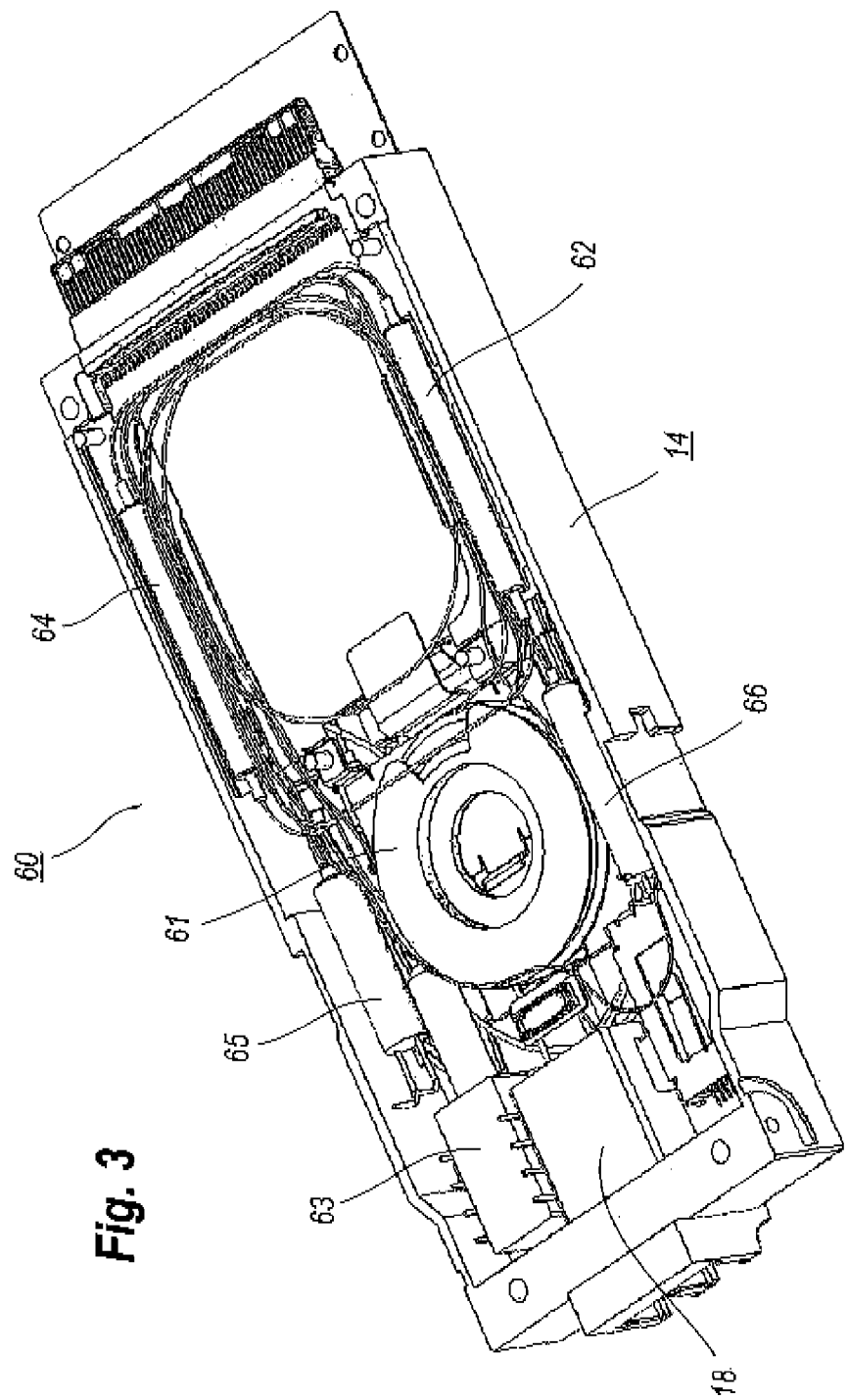

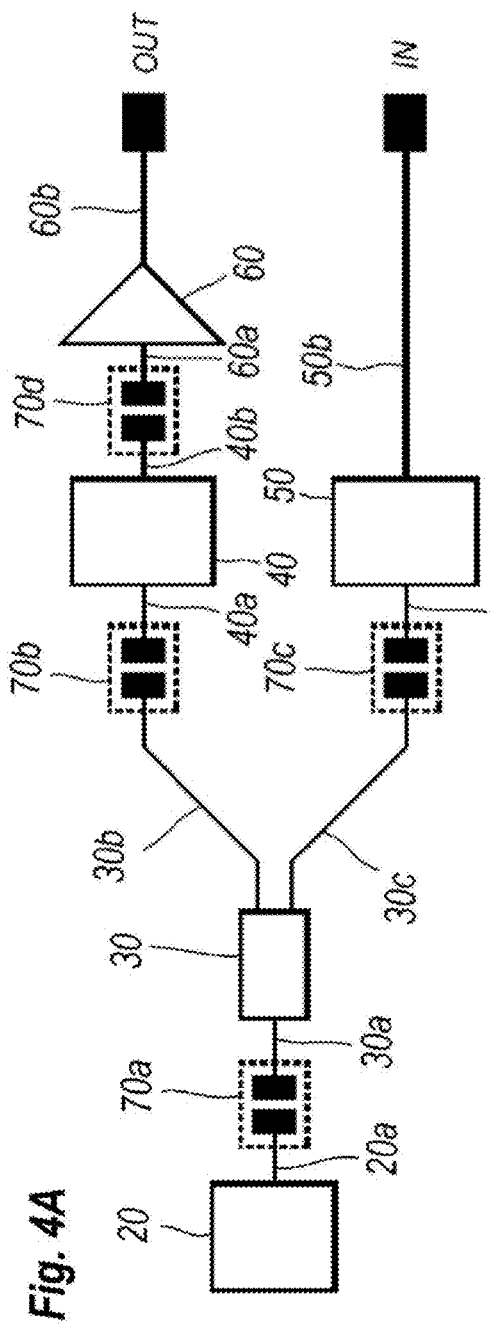
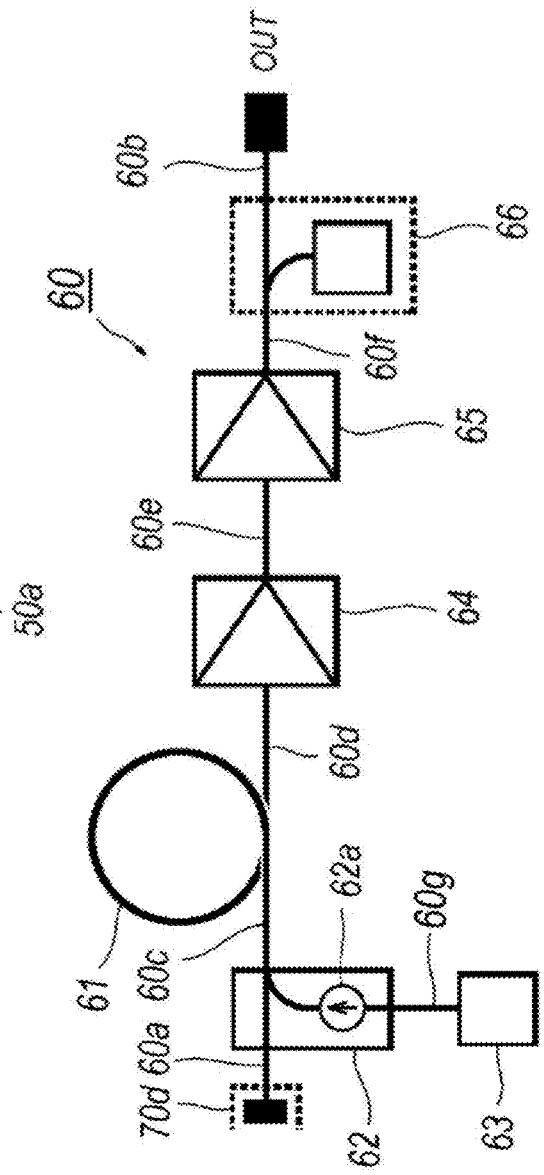
Fig. 4A
Fig. 4B

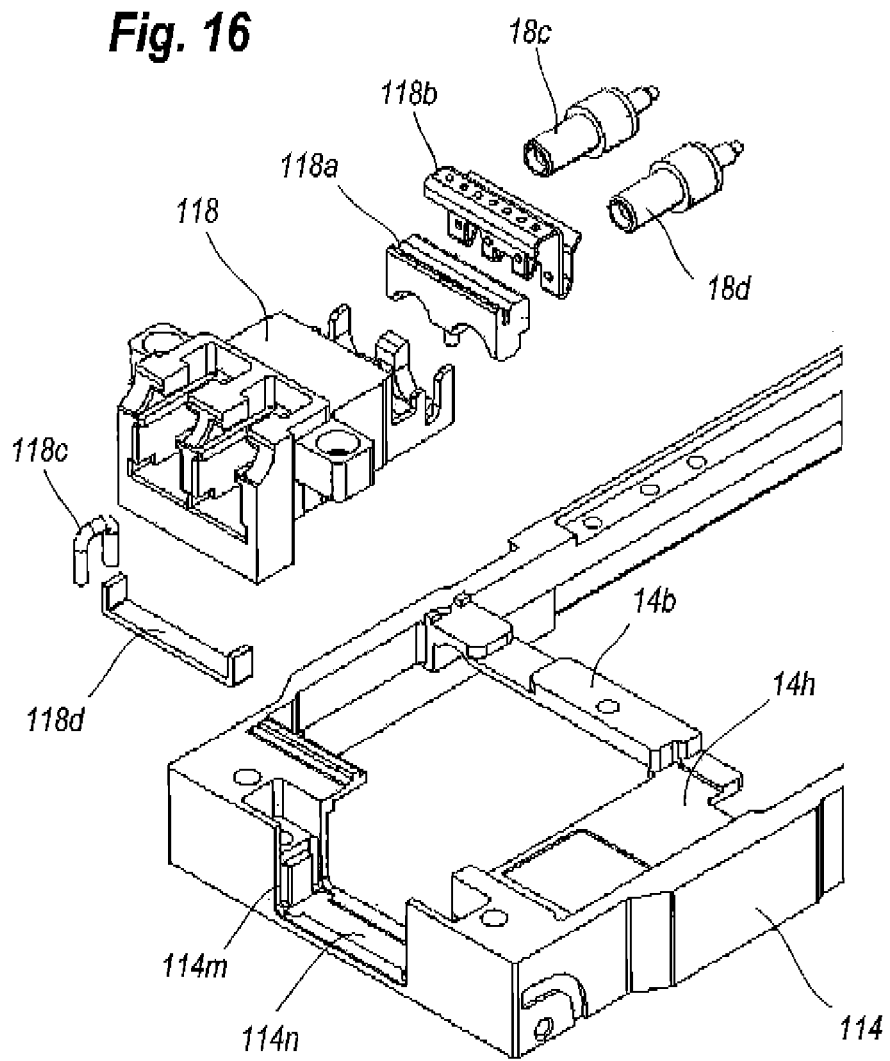

OPTICAL TRANSCEIVER IMPLEMENTING ERBIUM DOPED FIBER AMPLIFIER

CROSS REFERENCE TO RELATED APPLICATION

This application claims benefit of U.S. Provisional Application 62/062,576 filed Oct. 10, 2014, which is incorporated herein by reference.

BACKGROUND OF THE INVENTION

Field of the Invention

Abrupt increase of the information to be transmitted on an optical communication system has requested to an optical transceiver, which is applicable to the optical communication system, to be operable in further faster exceeding 10 Gbps and sometimes reaching 100 Gbps. In addition to the increase of the operation speed, some optical transceivers implement with a function of the coherent modulation where an optical signal is modulated in phase of light. Such a transceiver or the optical communication system to modulate the phase of the light are called as the coherent optical transceiver and the coherent optical system.

In a coherent transceiver, an optical modulator types of what is called, the Mach-Zehnder (MZ) modulator is inevitable to modulate a phase of light. The MZ modulator is conventionally made of dielectric material, typically a lithium niobate (NbLiO3), because of a large electro-optical interaction thereof. However, the MZ modulator of the dielectric material inevitably has large dimensions to show an enough interaction, which makes hard to be installed within an optical transceiver with a relatively smaller outer dimensions.

Another type of the MZ modulator primarily made of semiconductor material has been recently developed. Because of a larger refractive index of semiconductor materials compared with that of dielectric materials, the MZ modulator made of semiconductor materials has smaller dimensions to be installed within a small sized optical transceiver. However, as a compensation of the smaller dimensions, the MZ modulator of semiconductor materials inevitably or inherently shows a larger optical loss. Accordingly, a means to amplify an optical signal output from the MZ modulator, or entering the MZ modulator, that is an optical amplifier type of erbium doped fiber amplifier (EDFA), is necessary to be implemented within the optical transceiver.

SUMMARY OF THE INVENTION

One aspect of the present invention relates to an optical transceiver that transmits an optical signal and receives another optical signal, where the both optical signals are modulated with the dual polarization quadrature phase shift keying (DP-QPSK) method. The optical transceiver of the invention includes an optical source, an optical splitter, an optical modulator, an optical receiver, and an erbium doped fiber amplifier (EDFA). The optical source generates a continuous wave (CW) light. The optical splitter splits the CW light into two portions as maintaining a polarization of the CW light. The optical modulator modulates one of the portions of the CW light split by the optical splitter and outputs a modulated optical signal. The optical receiver interferes the received another optical signal with another of the portions of the CW light. The EDFA amplifies the modulated optical signal and outputs the amplified modulated signal as the output optical. The optical source, the optical splitter, the optical modulator, and the optical receiver are optically coupled with respective inner fibers type of a polarization maintaining fiber (PMC)

BRIEF DESCRIPTION OF THE DRAWINGS

FIG. 3 shows an inside of the optical transceiver viewed from the bottom;

FIG. 4A schematically illustrates an optical coupling system within the optical transceiver shown in FIGS. 1 to 3, and FIG. 4B also schematically illustrates the optical coupling within the EDFA;

FIG. 16 is an exploded view of the optical receptacle according to another embodiment of the present invention.

DESCRIPTION OF EMBODIMENTS

Next, some embodiments of an optical transceiver according to the present application will be described in detail. In the description of the drawings, numerals or symbols same with or similar to each other will refer to elements same with or similar to each other without duplicating explanations.

Figure 1:
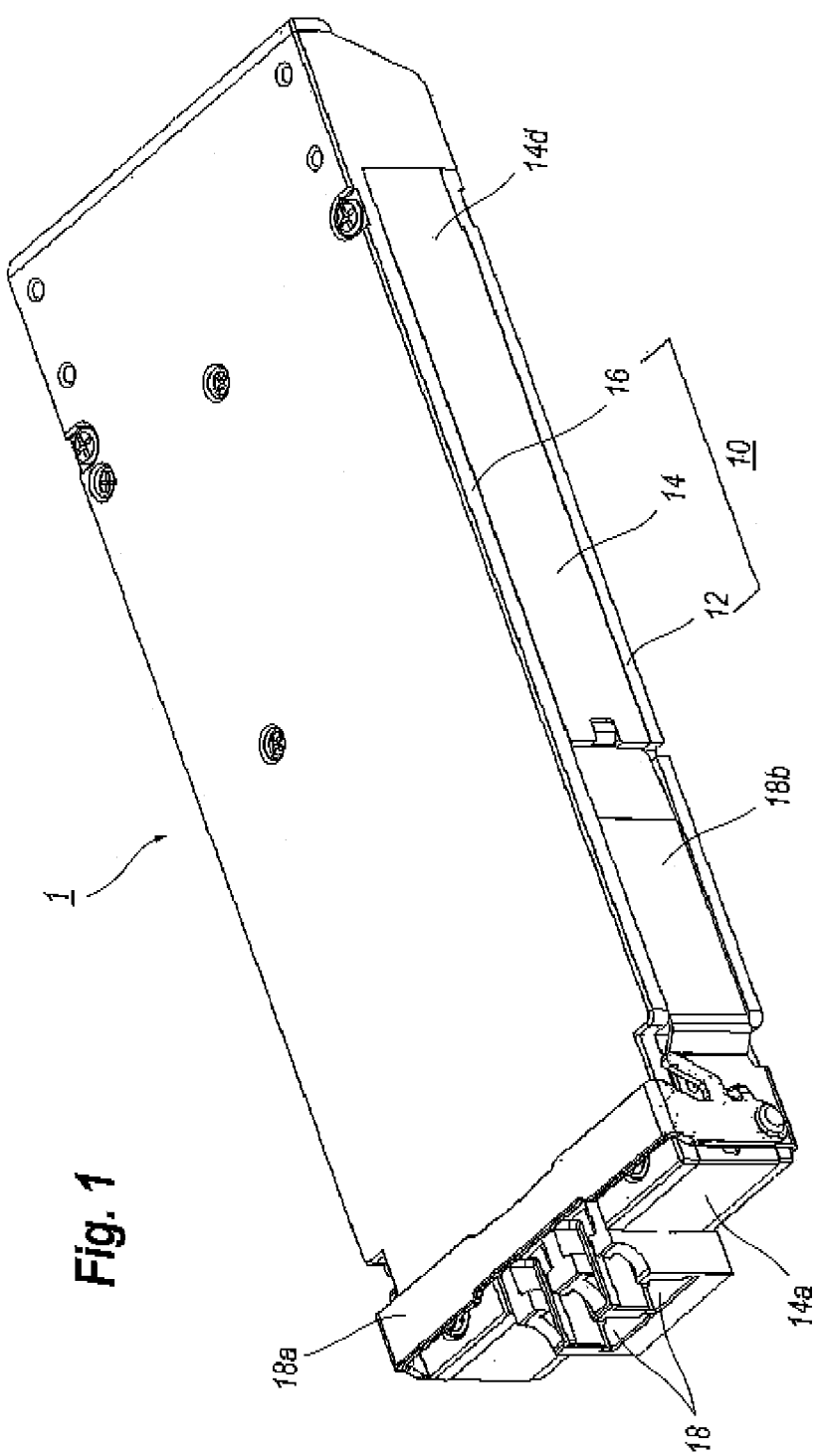
FIG. 1 shows an outer appearance of an optical transceiver of the present application, where the optical transceiver has a case whose dimensions follow the standard of CFP2.

FIG. 1 shows an outer appearance of an optical transceiver of the present application, where the optical transceiver of the present invention follows the standard of CFP2, which is one of multi-source agreements (MSA) defining specification and dimensions of an optical transceiver widely used in the field for the optical communication system. The optical transceiver 1 has a housing 10 whose dimensions follow the CFP2 standard, that is, the housing 10 has dimensions of 91.5 mm in a length, 41.5 mm in a width, and 12.4 mm in a height, respectively. As shown in FIG. 1, the housing 10 of the present embodiment comprises a top housing 12 or a top cover, a frame 14, and a bottom housing 16 or a bottom cover. The front wall 14a of the frame 14 provides an optical receptacle 18 of a type of LC receptacle.

The optical receptacle 18 provides two ports, one of which is for the optical transmission and the other is for the optical reception. Accordingly, the optical transceiver 1 may be operable in the full-duplex optical communication. Moreover, as described below, the optical transceiver 1 may be operable for the modulation system of the DP-QPSK (Dual Polarization Quadrature Phase Shift Keying) algorithm, where an optical signal entering the optical transceiver 1 contains four degrees of the multiplicity, namely, two multiplicities in the phase of light and two multiplicities in the polarization.

Respective sides of the front wall 14a provide a mechanism including a bail 18a and the slider 18b slidable rear and forward working with the rotation of the bail 18a. Thus, the optical transceiver 1 may be plugged with or released from the host system. Although not explicitly illustrated in FIG. 1, the optical transceiver 1 provides an electrical plug in a rear end thereof. The electrical plug is to be mated with an electrical connector provided in the host system, which establishes the communication with the host system. In the present specification, the term "front" or "forward" is assumed to be a direction where the optical receptacle 18 is provided. On the other hand, the term "rear" or "back" corresponds to a direction opposite thereto where the electrical plug is provided.

Figure 2:
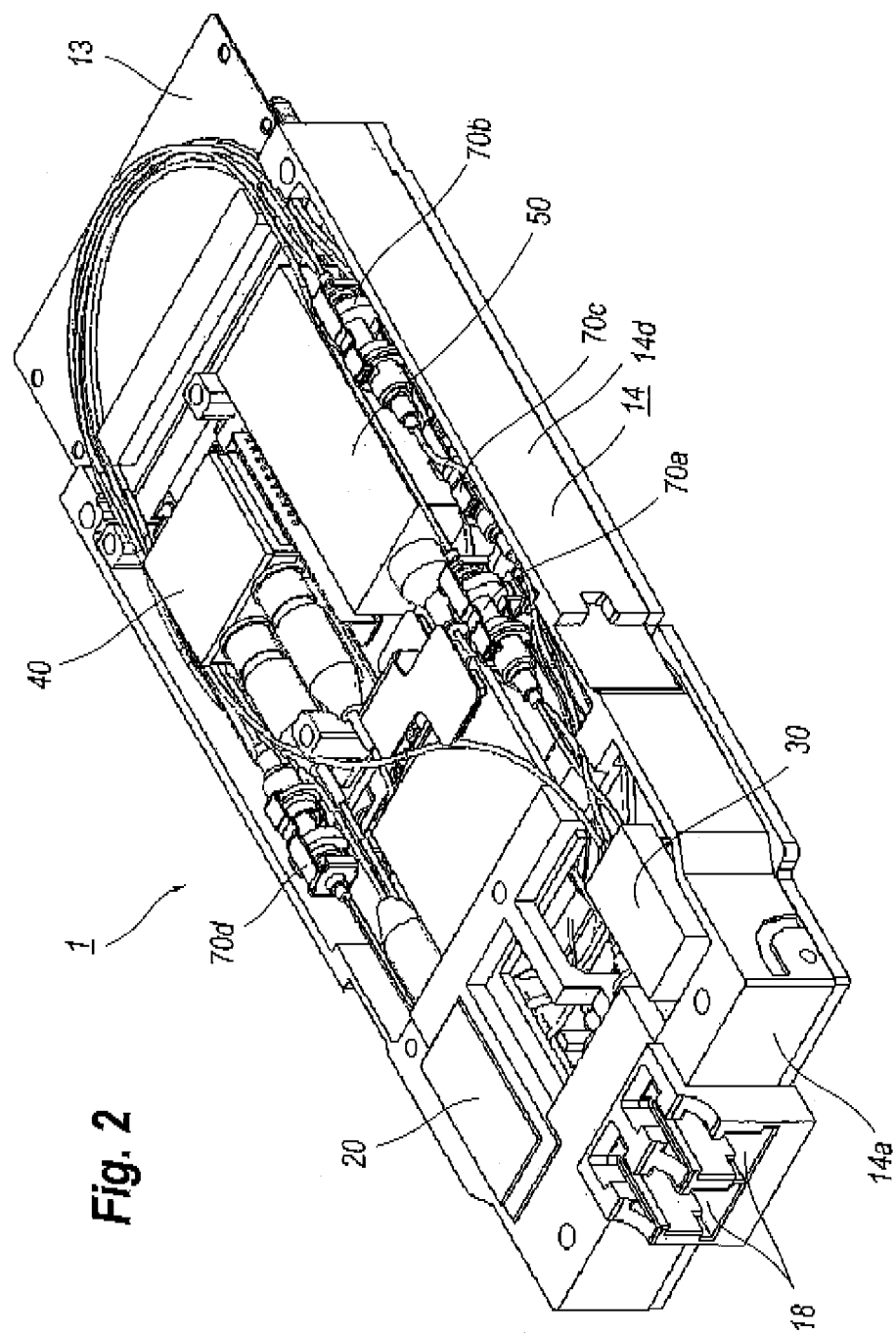
FIG. 2 shows an inside of the optical transceiver viewed from the top.

FIG. 2 shows an inside of the optical transceiver 1 viewed from the top as removing the top housing 12, and FIG. 3 shows an inside of the optical transceiver 1 viewed from the bottom as removing the bottom housing 16. The optical transceiver 1 includes, as optical components, the optical receptacle 18, a wavelength tunable optical source 20, a polarization maintaining splitter (PMS) 30, an optical modulator 40, an optical receiver 50, and an optical amplifier 60. The wavelength tunable optical source 20 may include a wavelength tunable laser diode (LD). The optical modulator 40 may be a type of a Mach-Zehender modulator MZM primarily made of semiconductor materials and/or a type of an arrayed waveguide modulator (AGM). The optical receiver 50 may be a coherent receiver that recovers information by multiplexing an optical signal with a local signal coming from the LD 20. Because the received optical signal is multiplexed in the polarization thereof the optical beam, namely, the local beam generated by the LD 20 is split to the optical modulator 40 and the optical receiver 50 by the polarization maintaining splitter 30.

The LD 20 and the PMS 30 are disposed in respective front sides as sandwiching the optical receptacle 18 therebetween. The optical modulator 40 and the optical receiver 50 are arranged in side-by-side in the rear. The EDFA 60 is disposed from the front to the rear under those optical components, 20 to 50. The optical components, 20 to 50, are coupled with some inner fibers accompanied with inner connectors, 70a to 70d, where some of inner fibers and some of inner connectors, 70a to 70d, are type of the polarization maintaining fiber (PMF) and the polarization maintaining connector (PMC).

Referring to FIG. 3, which is the bottom view by removing the bottom cover 16, the EDFA 60 is illustrated. The EDFA 60 includes an Erbium Doped Fiber (EDF) 61 wound around a bobbin 61a, a pump laser 63, a coupler 62 integrating with an optical isolator, a filter (GFF) 64 to flatten a gain characteristic of the EDF 61, an variable optical attenuator (VOA) 65, and a monitor photodiode (mPD) 66. These optical components are optically coupled by inner fibers. The optical transceiver 1 is necessary to set those inner fibers without bending them in a small diameter, for instance less than 15 mm, to avoid the bend-loss even when the inner fibers are a type of bend in-sensitive fiber.

FIG. 4A schematically illustrates an optical coupling system of the optical transceiver 1 shown in FIGS. 1 and 2. The LD 20 generates a local beam which is split by the PMS 30 into two beams. One of which is provided to the optical modulator 40 as a continuous wave (CW) source to be modulated. The other is provided to the optical receiver 50 as a local beam to be multiplexed with the optical signal entering the optical transceiver 1. The PMS 30 is coupled with the LD 20 with a polarization maintaining fibers (PMF), 20a and 30a, through the first polarization maintaining coupler (PMC) 70a. The PMS 30 is coupled with the optical modulator 40 by the PMFs, 30b and 40a, through the second PMC 70b; also coupled with the optical receiver 50 by the PMFs, 30c and 50a, through the third PMC 70c.

The optical receiver 50 is coupled with the PMS 30 through the PMFs, 30c and 50a, through the third PMC 70c. The optical receiver 50 receives the optical signal, which contains a plurality of signals extractable depending on the phases and the polarizations thereof through a single mode fiber (SMF) 50b from the input port of the optical transceiver 1. As described later, the SMF 50b and the PMF 50a are collectively coupled to the optical receiver 50.

The optical modulator 40 is disposed between two PMCs, 70b and 70d. The former PMC 70b couples with the optical modulator 40 by the PMF 40a, while, the latter PMC 70d couples with the optical modulator 40 by an SMF 40b. In FIG. 4A, bold lines denote the SMFs, while, slim lines denote the PMFs. Because the output of the optical modulator 40 is extracted through the SMF 60b, the coupler 70d connected thereto is unnecessary to be a type of the PMC. However, the optical transceiver 1 of the embodiment uses the PMC 70d to couple SMFs, 40b and 60a, because of the simplicity. The output of the optical modulator 40, as described above, is provided to the EDFA 60 through the SMF 60a.

For the EDFA 60, the EDFA 60 receives an optical signal from the optical modulator 40 through the SMFs, 40b and 60a. The optical signal is merged with a pump beam, which is generated by a pumping source 63 typically of a semiconductor laser diode by the wavelength selective coupler (WSC) 62. The WSC 62 includes an optical isolator 62a to prevent light back to the pumping source 63. The optical signal merged with the pump beam enters the EDF 61 through an inner fiber 60c and optically amplified thereby. The amplified optical signal is provided to the GFF 64 through the inner fiber 60d. Because the EDF 61 has an optical gain strongly depending on wavelengths of the optical signal; the GFF 64 equalizes the gain spectrum of the EDF 61. The equalized optical signal is provided to the variable optical attenuator (VOA) 65 through another inner fiber 60e. The VOA 65 variably attenuates the equalized optical signal to an adequate power level. The monitor photodiode (mPD) 66 is put in downstream of the VOA 65. The mPD 66 monitors the optical beam output from the VOA 65 and adjusts the power level thereof in an adequate level defined by the specification of the MSA by controlling the VOA 65. The optical signal thus amplified, equalized, and variably attenuated to the adequate level is output from the output port through the inner fiber 60b. The inner fibers, 60a to 60d, implemented in the EDFA 60 may be the SMF.

Figure 5:
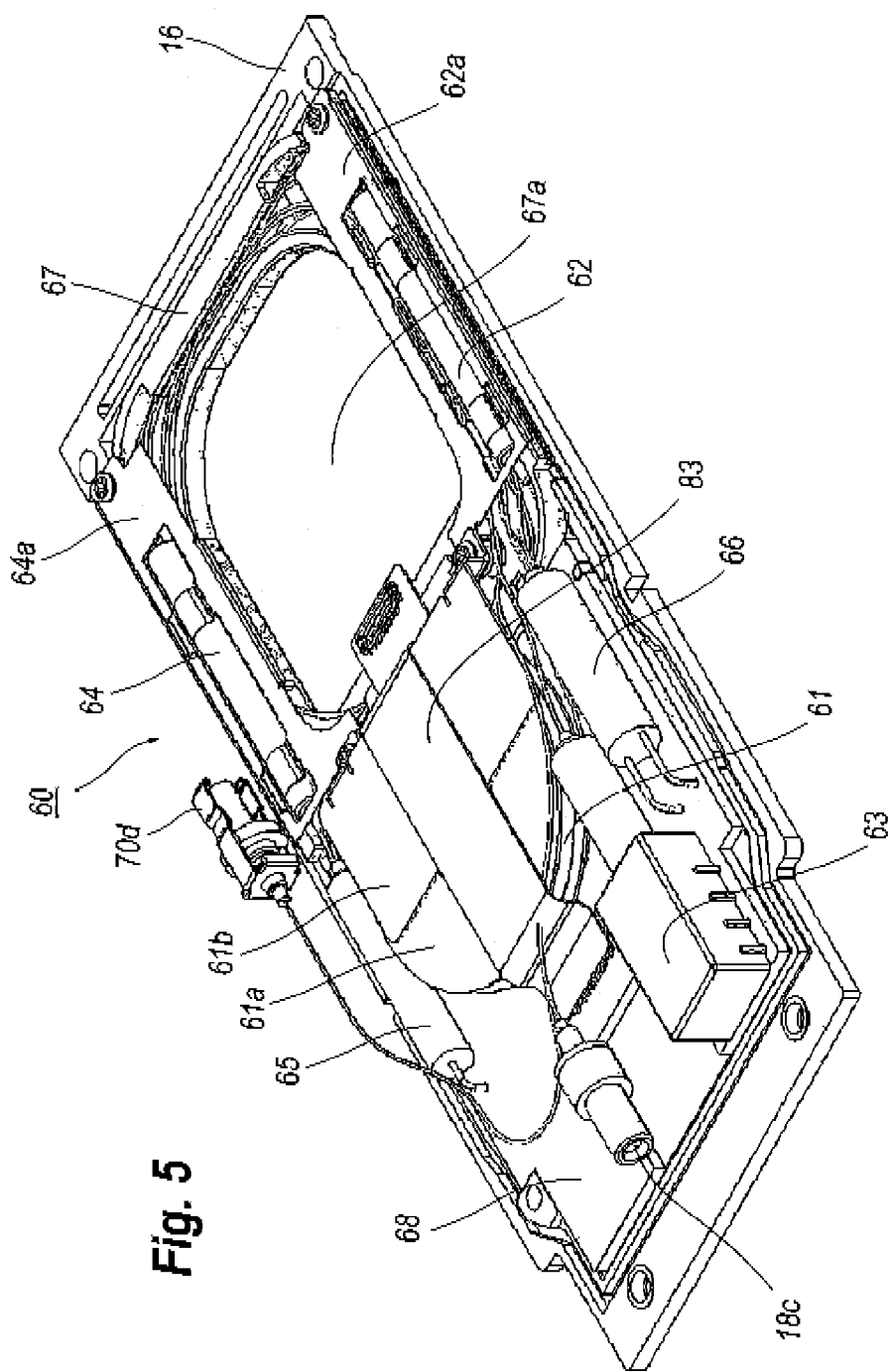
FIG. 5 shows an Erbium Doped Fiber Amplifier (EDFA) installed on the bottom cover of the optical transceiver.
Figure 6:
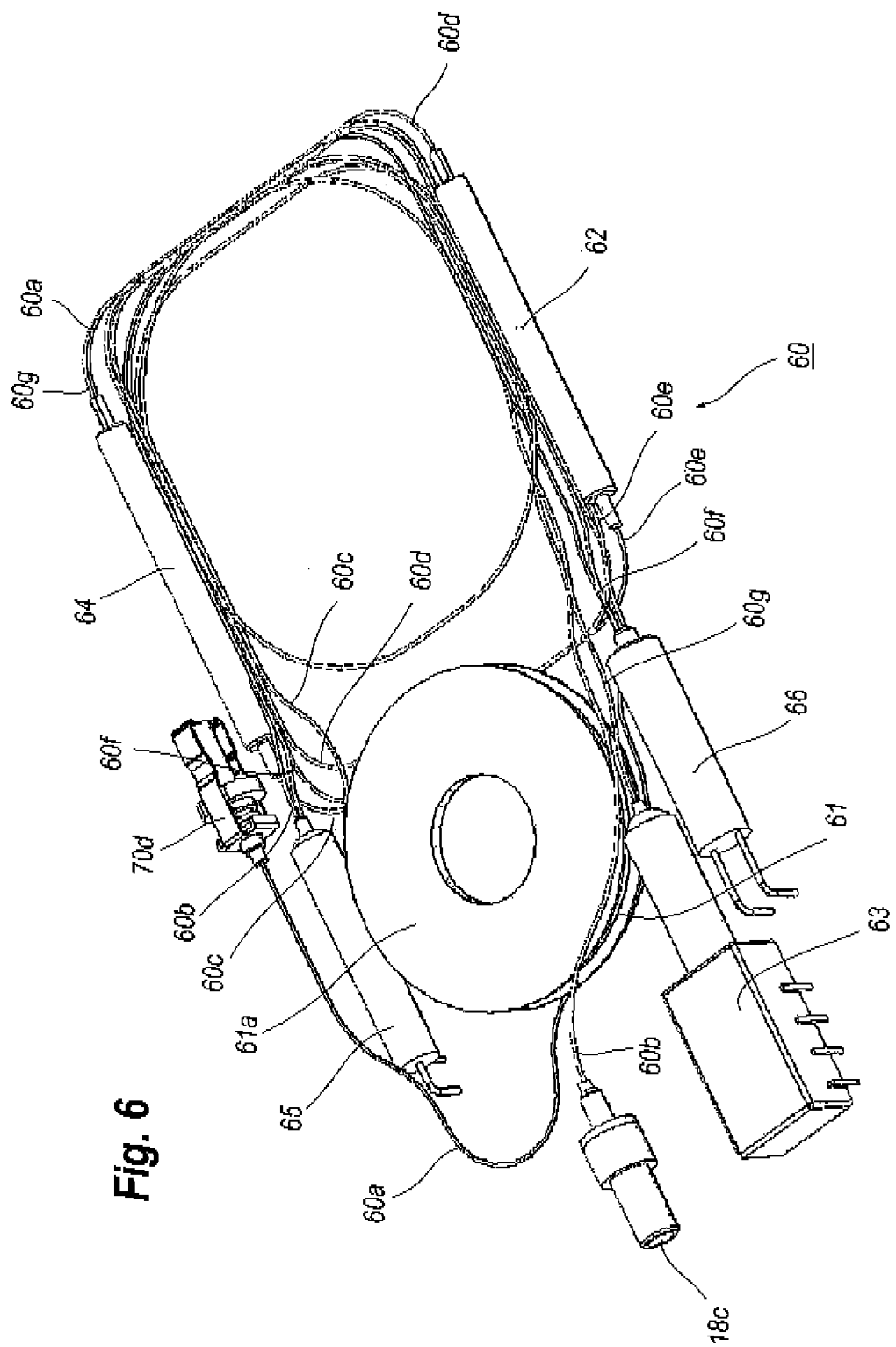
FIG. 6 shows an optical arrangement of the EDFA.

FIG. 5 is a perspective view of the EDFA 60 installed on the bottom housing 16 of the optical transceiver 1, and FIG. 6 shows an optical arrangement of the EDFA 60. As shown in FIG. 5, the EDFA 60 of the present embodiment occupies a large space within the housing 10. Accordingly, it becomes the most important design how the EDFA 60 is assembled within the housing 10. The optical transceiver 1 of the embodiment disposes the pumping source 63 having a box-shaped package in a front area within the housing 10 in side-by-side arrangement with respect to the LD 20. As described later in the present specification, the pumping source 63 and the PMC 70d are set in up and down. That is, the PMC 70d is arranged on a shelf extending inward from the outer wall of the frame 14, and the pumping source 63 is installed beneath the shelf. As illustrated in FIG. 4B, the EDFA 60 provides many inner fibers, 60a to 60g, to optically couple respective components. The present embodiment sets all of the inner fibers of the EDFA 60 in a fiber tray 67, which is directly mounted on the bottom housing 16. The fiber tray 67 has a room in a center thereof that is, the inner fibers, 60a to 60g, of the EDFA 60 are wound around the periphery of the fiber tray 67 so as to form the vacant center 67a. As described later, the vacant center 67a is utilized to mount electrical components on the circuit board.

The fiber tray 67 assembles in both sides thereof the WSC 62 and the GFF 64 each covered with metal covers, 62a and 64a. The metal covers, 62a and 64a, are assembled with the fiber tray 67 so as to form spaces for placing the WSC 62 and the GFF 64 therein. That is, the WSC 62 and the GFF 64 each have cylindrical outer shape, and the metal covers, 62a and 64a, has hollows in respective longitudinal centers to receive the WSC 62 and the GFF 64 therein. Even when the WSC 62 and the GFF 64 are set in respective spaces; the vacant center of the fiber tray 67 is left.

The EDF 61, which is wound around the bobbin 61a so as to form the EDF coil, the mPD 66, and the VOA 65 are arranged in respective sides of the bottom housing 16. The pumping source 63 and the coiled EDF 61 are set on an EDF circuit board 68 that installs circuits to control the EDFA 60. The circuits include a pumping source driver, a VOA controller, and so on. The fiber tray 67 and the EDF circuit board 68 are directly mounted on the bottom housing 16, while, the bobbin 61a, the GFF 64 and the VOA 65 are set on the fiber tray 67.

FIG. 6 shows the arrangement of the inner fibers, 60a to 60g, in the EDFA 60, where FIG. 6 removes the fiber tray 67, the metal covers, 62a and 64a, and the bottom housing 16. Referring FIG. 4B and FIG. 6, the EDFA 60 receives an optical signal, which is the output of the optical modulator 40, from the fourth PMC 70d through the inner fiber 60a that extends from the PMC 70d forwardly, turns around the bobbin 61a, extends rearward along a side of the GFF 64, turns toward the WSC 62 placed in the side opposite to the GFF 64, and enters the WSC 62 from the rear. Note that, the inner fiber 60a is bent in the rear side with a diameter smaller than 15 mm, that is, the inner fibers, 60a to 60g, in the EDFA 60 are specialty fiber having superior tolerance against the bent loss.

The WSC 62 also receives the inner fiber 60g coming from the pumping source 63. The inner fiber 60g is extended from the pumping source 63 rearward, runs in parallel to the former inner fiber 60a along the GPF 64, also turns inward the WSC 62 in the rear end of the bottom housing 16, and finally enters the WSC 62 commonly with the former inner fiber 60a. The optical signal propagating in the inner fiber 60a couples with the pumping light propagating in the other inner fiber 60g in the WSC 62 and output in the third inner fiber 60c from the port set opposite to the side where two inner fibers, 60a and 60b, couple. Third inner fiber 60c, which is output from the WSC 62, extends in the rear of the bottom housing 16 as rounding the fiber tray 67 and couples with the EDF 61 wound around the bobbin 61a. The inner fiber 60d output from the EDF 61 extends halfway around the fiber tray 67 and immediately enters the GFF 64 from the rear. The GFF 64 outputs the inner fiber 60e from the front side. This inner fiber 60e extends around the fiber tray 67 and enters the VOA 65 from the rear, where the VOA 65 is placed on the circuit board 68 and in front of the GFF 64. The VOA 65 outputs the inner fiber 60f from the rear. That is, the inner fiber 60e is turned back to the inner fiber 60f by the VOA 65. The inner fiber 60f output from the VOA 65 rounds the fiber tray 67 in the rear of the bottom housing 16 and enters the mPD 66 from the rear, where the mPD 66 is also placed on the circuit board 68 but in the other side of the VOA 65. The mPD 66 outputs the inner fiber 60b rearward. The inner fiber 60b, similar to other inner fibers, 60a to 60f, makes halfway around the fiber tray 67 in the rear of the housing 10, and extends forward to the optical receptacle 18. Thus, the inner fibers, 60a to 60g, come and go between two sides of the housing 10 as running along the fiber tray 67, where respective sides mount the optical components of the WSC 62, the pumping source 63, the GFF 64, the VOA 65, and the mPD 66.

Figure 7:
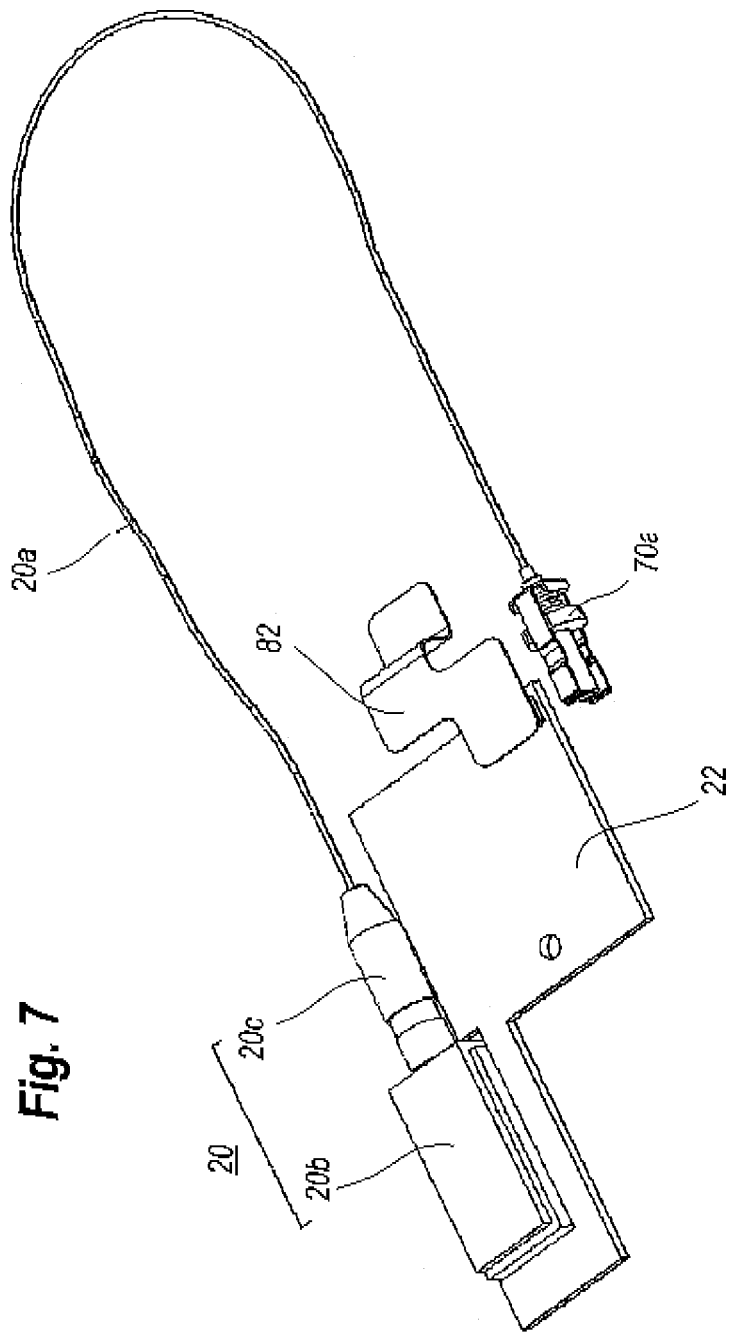
FIG. 7 shows an optical arrangement of a wavelength tunable laser diode (LD)

FIG. 7 shows an optical interconnection of the LD 20. The LD 20, which has a box-shaped housing 20b, is mounted on an LD support 24, where the LD support 24 is assembled with the frame 14, in a side of the optical receptacle 18 such that the optical receptacle 18 is put between the LD 20 and the pumping source 63. That is, the LD 20 is placed on the LD support 24 and the LD support 24 is screwed with the frame 14 from the bottom such that a top of the box-shaped housing 20b exposes from a square opening formed by the front wall 14a, a side wall 14d, a timber 14c and a beam 14b. The lead terminals are extracted from a midway and only in one side of the box-shaped housing. The optical transceiver 1 provides a daughter board 22, the LD circuit board, to install circuits to drive the LD 20. The LD circuit board 22 is also screwed to the beam 14b of the frame 14. Interconnections on the LD circuit board 22 are directly connected to lead terminals of the box-shaped housing. Also, the interconnections on the LD circuit board are connected to circuit in the mother board 80 illustrated in FIG. 2 with a flexible printed circuit (FPC) board 82. Because the LD 20 outputs a continuous wave (CW) signal, specifically, the wavelength and the magnitude of the CW signal are controlled primarily by DC biases applied to the LD 20, the FPC board 82 is unnecessary to take high frequency performance of the operation into account. The LD 20 also provides a coupling portion 200 with a cylindrical shape and extending from one side wall of the box-shaped housing 20b.

The CW signal of the LD 20 is extracted rearward by the inner fiber 20a, which is the type of the polarization maintaining fiber. The inner fiber 20a makes a halfway round in the rear, and runs forwardly to the first PMC 70a that couples the inner fiber 20a with the other inner fiber 30a extended from the PMS 30. Note that, as shown in FIG. 2, the inner fiber 20a is once extracted externally from the housing 10 in the rear and makes a halfway turn in the outside of the housing 10. The rear wall 14e of the frame 14 provides two cuts, 14f and 14g, to pass the inner fibers therethrough.

Figure 8:
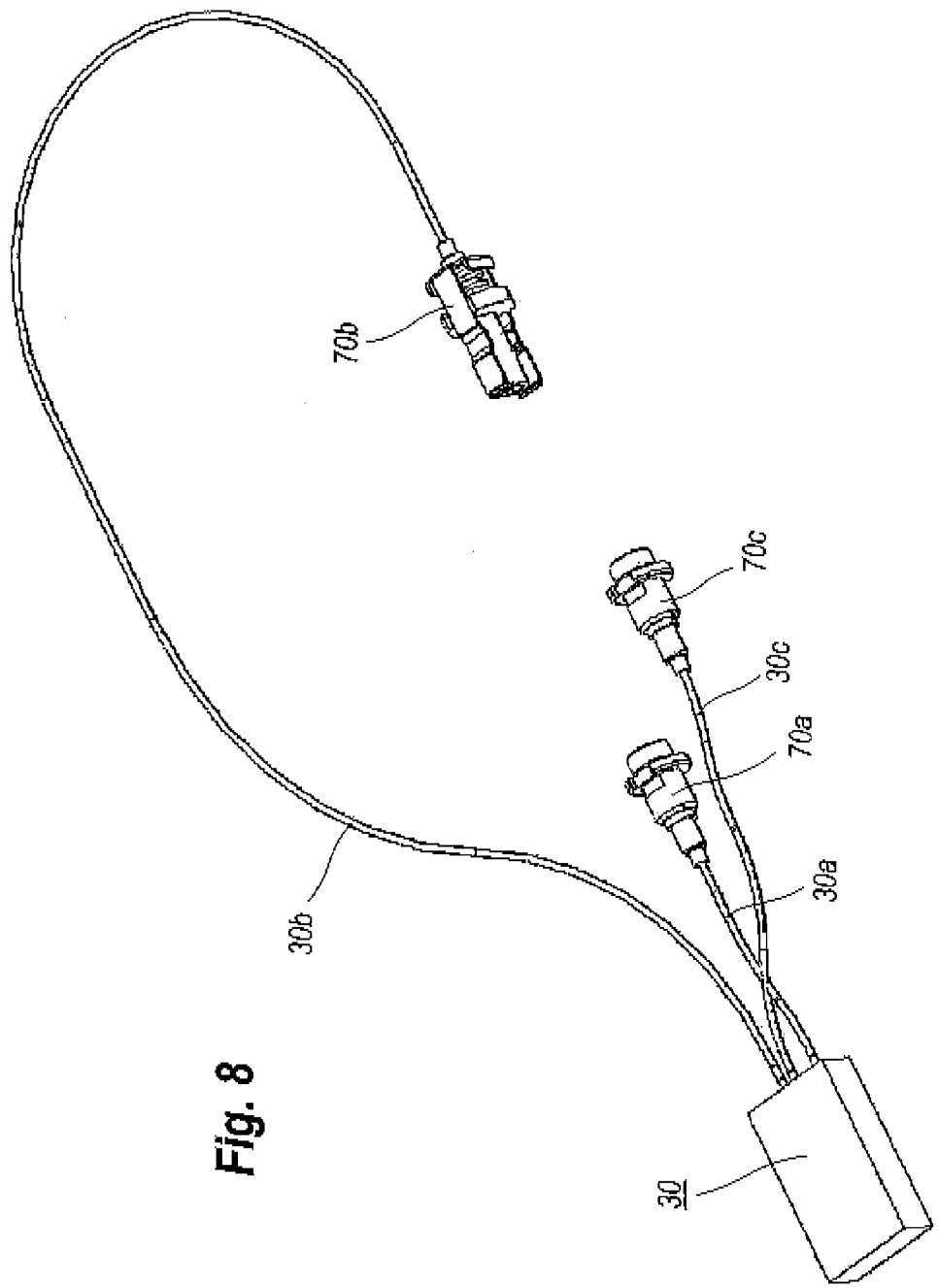
FIG. 8 shows an optical arrangement around a polarization maintaining splitter (PMS)

FIG. 8 shows an optical interconnection around PMC 30. The PMS 30 is set in the front side of the housing 10; the PMS 30 is set on the pumping source 63 up-and-down arrangement. Specifically, the PMS 30 is placed on a shelf 14h of the frame 14 and the pumping source 63 is mounted on the EDFA circuit board 68 in a portion beneath the shelf 14h. The PMS 30 receives the inner fiber 30a, which is also the type of the PMF, from the first PMC 70a. The PMS 30 splits the CW signal propagating on the inner fiber 30a into two portions as maintain the polarization thereof. One of two portions is output to the inner fiber 30b to the second PMC 70b, while, the rest of the two portions is output to the inner fiber 30c to the third PMC 70c. The inner fiber 30b, similar to the aforementioned inner fiber 20a, extends rearward from the PMS 30 along one of the side walls of the frame 14, runs side by side with the inner fiber 20a, passes the cut 14f in the rear wall 14e, makes a halfway turn in the outside of the frame 14, enters inside of the frame 14 as passing the other out 14g, finally couples with the second PMC 70b.

Figure 9:
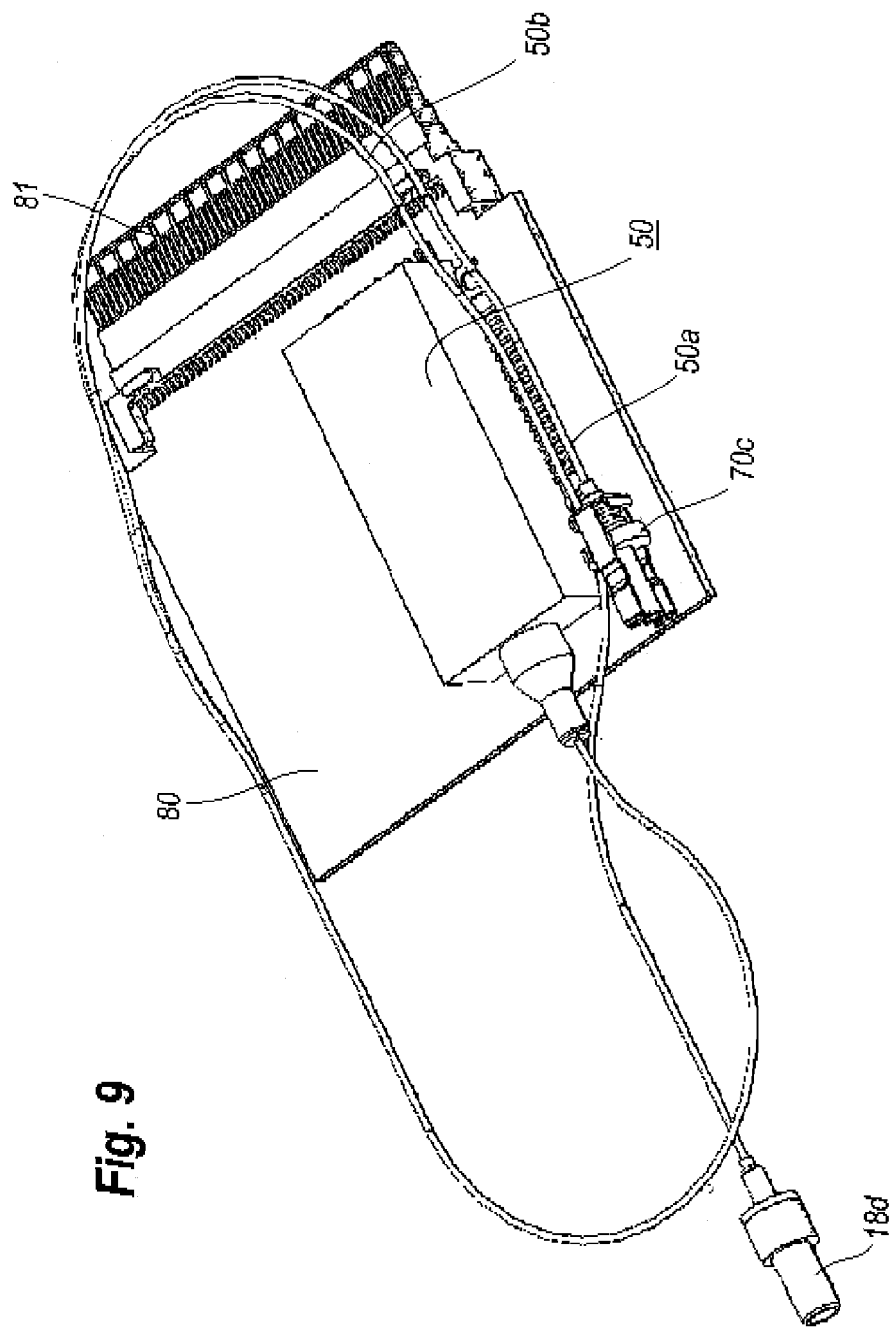
FIG. 9 shows an optical arrangement around an intelligent coherent receiver (ICR)

FIG. 9 shows an optical arrangement around the optical receiver 50. The optical receiver 50 is mounted on the mother board 80 side-by-side with the optical modulator 40, which will be described later. The optical receiver 50 receives two inner fibers, one 50a comes from the PMS 30 through the inner fiber 30c and the third PMC 70c, and the other 50b comes from the optical receptacle 18. Two inner fibers, 50a and 50b, are bundled in a midway thereof to one bundled fiber 50c. That is, the optical receiver 50 physically receives only one bundled fiber 50c. The bundle means that two fibers independently exist within the bundled fiber 50c but they have one common sheath. Note that, two inner fibers, 50a and 50b, similar to the aforementioned inner fibers, form a halfway around in the outside of the frame 14.

Figure 10:
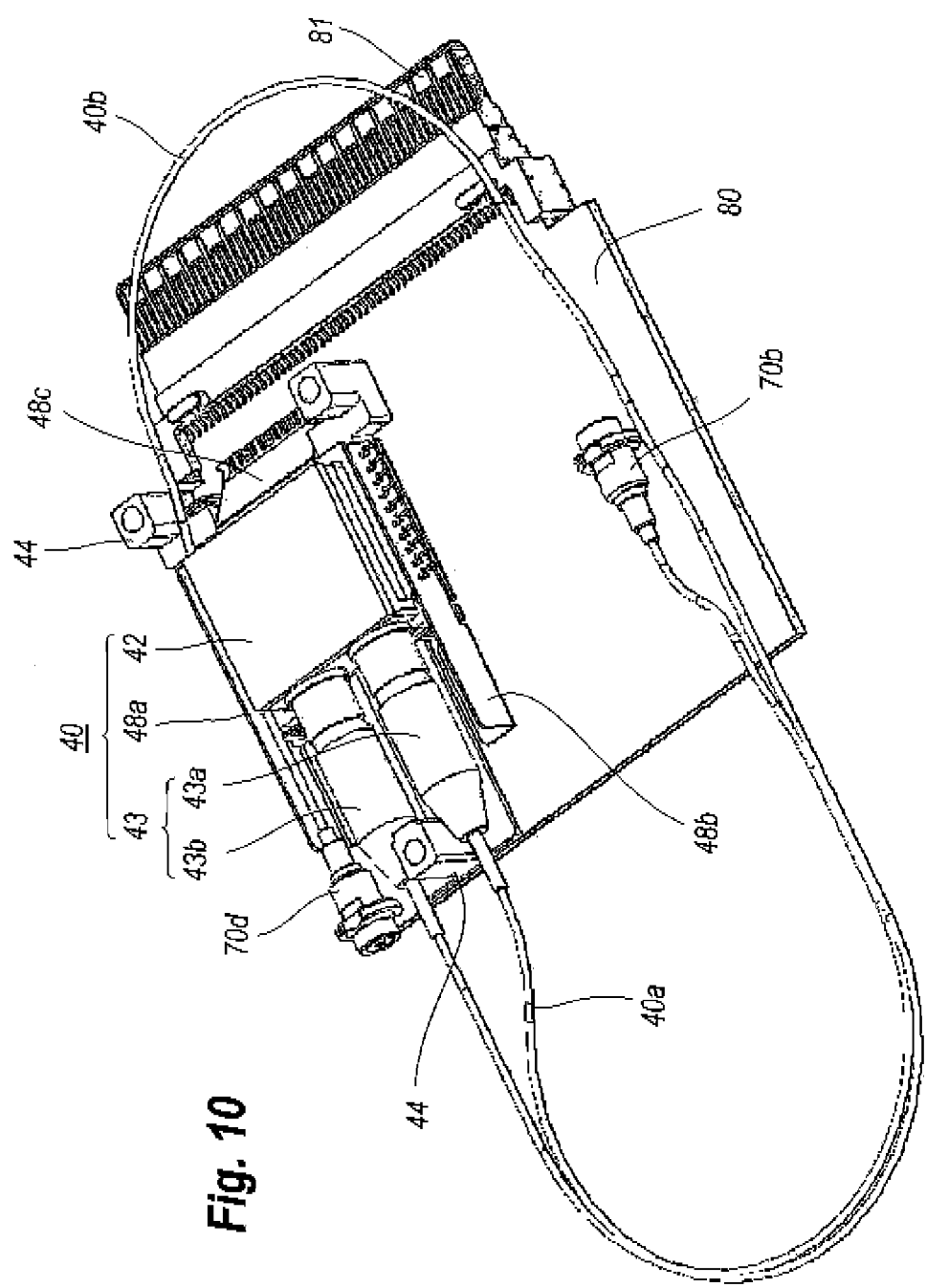
FIG. 10 shows an optical arrangement around a MZ modulator.
Figure 11:
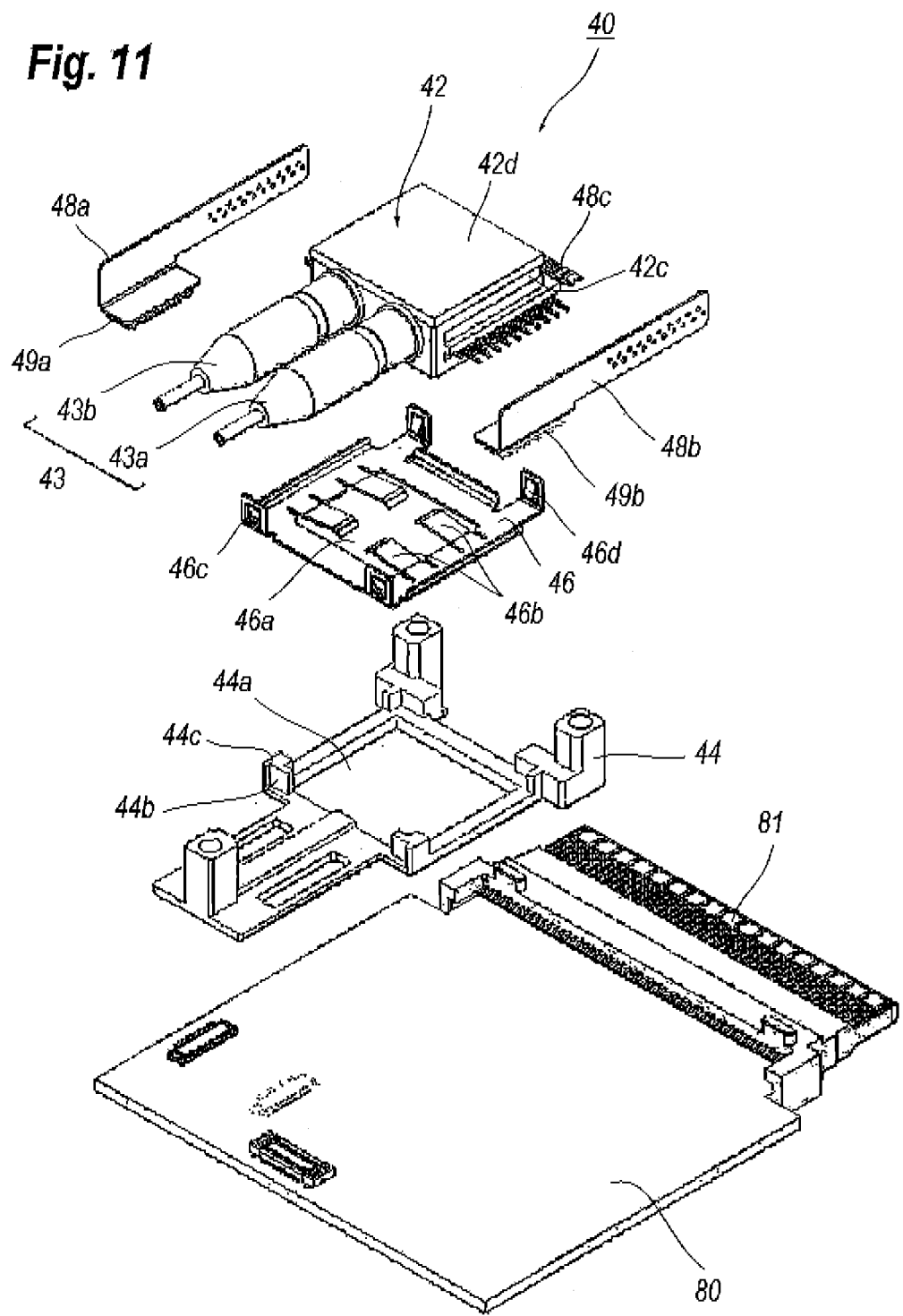
FIG. 11 is an exploded view of the MZ modulator.
Figure 12:
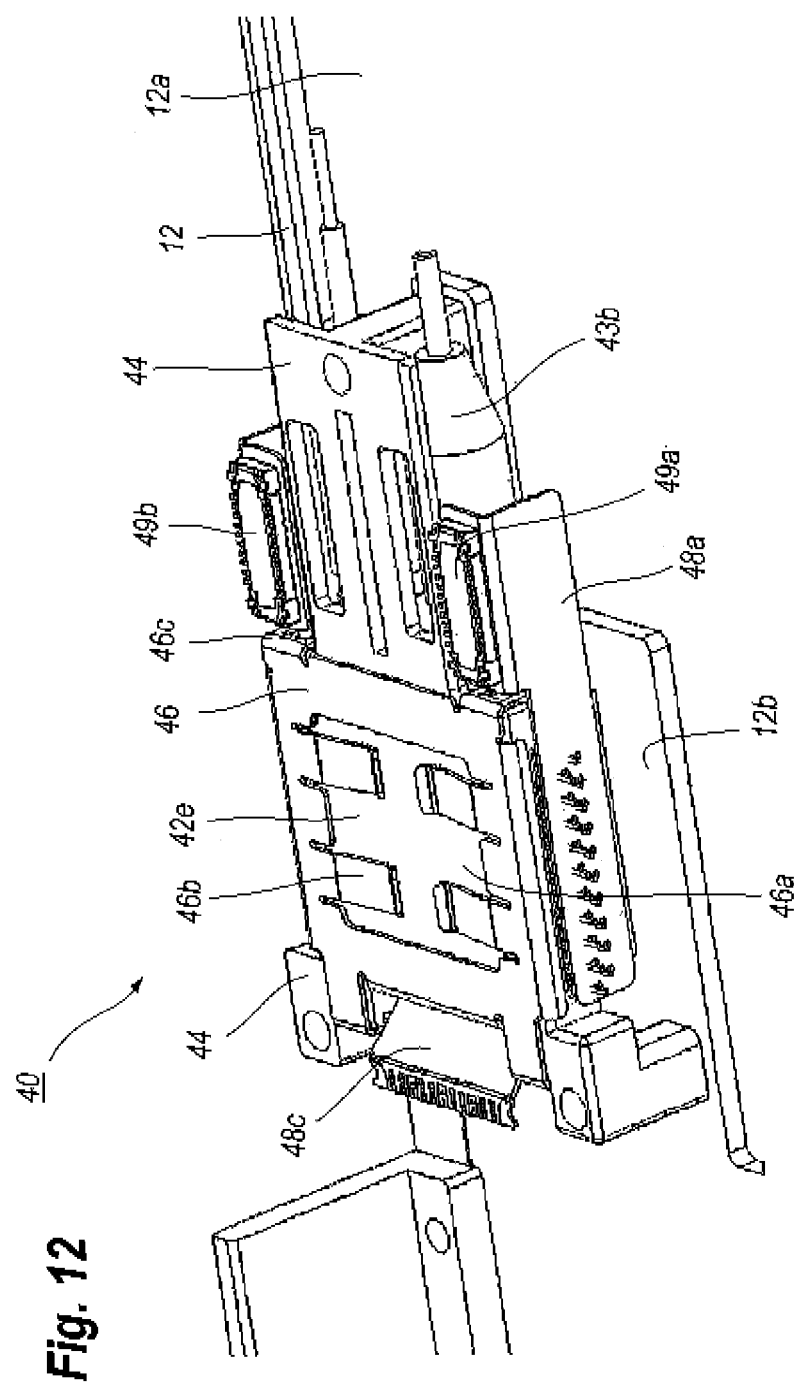
FIG. 12 shows the MZ modulator fixed to the top cover.

FIG. 10 shows an optical interconnection around the optical modulator 40, FIG. 11 is an exploded view of the optical modulator 40, and FIG. 12 is a perspective view of the optical modulator 40 assembling the support 44, the cover, 46, and flexible printed circuit (FPC) boards, 48a to 48c, accompanying with electrical connectors, 49a and 49b, where FIG. 12 removes the mother board 80. As described, the optical modulator 40 is set on the mother board 80 side-by-side with the optical receiver 50. The optical modulator 40 has two optical ports, one is the input port 43a to receive the CW signal provided from the LD 20 through the PMS 30, and the other is the output port 43b to output the modulated signal to the EDFA 60. The input port 43a couples with the inner fiber 40a, which is the type of the PMF and connected to the second PMC 70b to receive the CW signal. The output port 43b extracts the other inner fiber 40b, which is unnecessary to be the type of the PMF. The latter inner fiber 40b makes a halfway turn in the front and runs rearward. Similar to the aforementioned inner fibers, the inner fiber 40b is once extracted outside the frame through the cut 14g, makes a halfway turn, and drawn inside of the frame 14 again to couple the fourth PMC 70d.

As shown in FIG. 11, the optical modulator 40 has a box-shaped housing 42 and a coupling portion 43 including two optical ports, 43a and 43b, extending from one side wall 42c of the housing 42. In the present embodiment, the optical modulator 40 is fixed to the top housing 12. That is, although the optical modulator 40 is placed on the mother board 80 and electrically connected to the mother board 80, the optical modulator 40 is not rigidly fixed to the mother board 80 but assembled with and fixed to the top housing 12. Specifically, the top housing 12 provides a terrace 12b, which is formed in thicker, in the inner surface 12a thereof, where the top surface 42d of the box-shaped housing 42 is physically fixed and thermally in contact thereto. Because the optical modulator 40 installs an electrical device generating heat during the operation thereof, a mechanism to conduct heat efficiently to an external material is inevitable. The present optical modulator 40 provides a device to generate primary portion of heat inside of top surface 42d thereof. Accordingly, the optical transceiver 1 makes the top housing 12 in physically and thermally contact with the top surface 42d of the optical modulator 40. In a modification, the housing 42 of the optical modulator 40 may be in thermally and physically contact to the terrace 12b of the top housing 12 by interposing a thermal sheet to enhance the heat conductance from the optical modulator 40 to the top housing 12.

The support 44, which may be made of resin, provides a square opening 44a in a center thereof through which the bottom surface 42e of the optical modulator 40 exposes. Three screws fix the support 44 to the top housing 12. The optical modulator 40 is also assembled with the cover 46. The cover 46, which may be made of metal, also has a square opening 46a in a center thereof corresponding to the square opening 44a of the support 44. However, the cover 46 has a plurality of tabs 46b extending within the square opening 46a. The tabs 46b are slightly bent upward to show an elastic function. That is, the tabs 46 in end portions thereof come in contact with the bottom surface 42e of the optical modulator 40 and push the housing 42 upward by the elastic functions to abut the housing 42 against the top housing 12. Accordingly, the top surface 42d of the optical modulator 40 may be thermally in contact with the top housing 12 to form the heat-dissipating path thereto. Thus, the optical modulator 40 is fixed to the top housing 12 through the support 44. The cover 46 is assembled with the support 44 by hooking barbs 46b provided in respective corner legs 46c with pockets 44b also provided in respective corner posts 440 of the support 44. Although the present embodiment provides the cover 46 between the optical modulator 40 and the top housing 12, the cover 46 may be removed when the support 44 may securely push the optical modulator against the top housing 12.

The optical modulator 40 receives high frequency signals from the host system through the mother board 80 and the RF FPC board 48c connected to the rear wall of the housing 42. As shown in FIG. 2, the rear wall of the optical modulator 40 faces the rear wall 14e of the frame 14, exactly, just in front of the rear wall 14e of the frame 14. This arrangement makes a path from the plug board 81, which receives the high frequency signals from the host system, to the optical modulator 40 shortest. The optical modulator 40 may receive high frequency signals through the RF FPC board 480 connected in the rear wall thereof. Because the path from the host system to the mother board 80 is designed in shortest, and the path from the mother board 80 to the optical modulator 40 is also designed in shortest by the RF FPC board 48c, the high frequency performance of the optical modulator 40 may be secured.

In addition to the high frequency signals, the optical modulator 40 receives some DC biases to control a modulation device implemented in the housing 42. The DC biases are provided from lead pins formed in respective sides of the housing 42. Specifically, two side FPCs, 48a and 48b, are connected to lead pins in respective sides, and lengthened forward to a portion under the optical ports, 43a and 43b, then, bent inward such that the bent portions of the side FPC boards, 48a and 48b, face the mother board 80. The side FPC boards, 48a and 48b, provide respective stacking connectors, 49a and 49b, in the bent portions facing downward, which are electrically connected to the connectors provided in the mother board 80. Thus, the optical modulator 40 may receive the DC biases from the mother board 80 through the stacking connectors, 49a and 49b, and the side FPC boards, 48a and 48b. The side FPC boards, 48a and 48b, may compensate gaps inevitably caused between the bottom surface of the housing 42 and the mother board 80 due to flexibility or elastic functions inherently accompanying thereto even when the optical modulator 40 is fixed to the top housing 12.

Next, a method to assemble thus described optical transceiver will be described as referring to FIGS. 2, 5, and 13 to 15.

Figure 13:
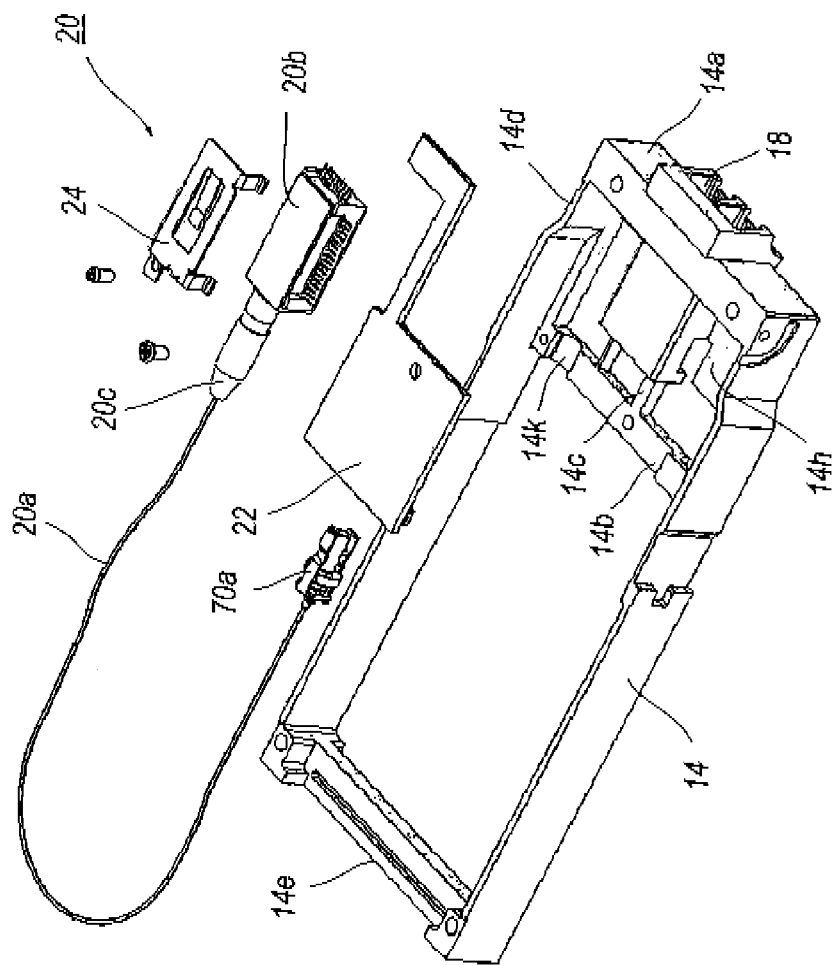
FIG. 13 is an exploded view of the LD and the frame.

The assembly process first assembles the LD 20 accompanying with the inner fiber 20a and the first PMC 70a with the frame 14. FIG. 13 is an exploded view of the LD 20 and the frame 14. The LD 20 is first soldered in the lead terminals thereof provided in the side and rear walls of the box-shaped housing 20b to the LD circuit board 22, where the coupling portion 20c are rigidly fixed to the front wall of the box-shaped housing 20b and extracts the inner fiber 20a by, what is called, the pig-tailed arrangement. The end of the inner fiber 20a is assembled with the first PMC 70a. The process next screws the LD circuit board 22 with the timber 14c that provides a saddle 14k on which the coupling portion 20c is set. After screwing the LD circuit board 22, the process covers the box-shaped housing 20b with the LD support 24. As illustrated in FIG. 13, the LD support 24 provides an opening in a center portion thereof facing the lid of the box-shaped housing 20b. A tab extends from one of frames of the LD support 24 within the opening such that an end portion of the tab pushes the box-shaped housing 20b downward to securely make the tab thermally in contact with the box-shaped housing 20b. The inner fiber 20a is pulled out from the coupling portion 20c rearward, once brought externally as passing through the cut 14g, turned back to the inside of the frame 14 as passing the other cut 14f, and couples with the first PMC 70a, where FIG. 13 hides the two cuts, 14f and 14g.

Then, the optical receiver 50 is placed on the mother board 80. The lead terminals of the optical receiver 50 are extracted from the bottom thereof the soldering of the lead terminals may be easily carried out.

Next, the optical modulator 40 and the optical receiver 50 are assembled on the mother board 80. Referring to FIG. 11, the side FPCs, 48a and 48b, and the RF FPC 48c are soldered with respective lead terminals of the box-shaped housing 42. The side FPCs, 48a and 48b, each provide respective stuck connectors, 49a and 49b, in ends not fixed to the lead terminals. The box-shaped housing 42 thus assembled with the FPCs, 48a to 48c, is set on the cover 46 such that the bottom of the box-shaped housing 42 abuts against the tabs 46b in a center thereof. The cover 46 that mounts the box-shaped housing 42 is then set on the support 44 such that the opening 46a of the cover 46 is aligned with the opening 44a of the support 44. Fitting the corner posts 44c of the support 44 with the legs 46c of the cover 46, the cover 46 is tightly assembled with the support 44, but the box-shaped housing 42 is merely placed on the cover 46, that is, the box-shaped housing 42 is movable an the tabs 46b. Finally, the RF FPC board 48c is soldered with the mother board 80, and the respective stacking connectors, 49a and 49b, are mated with the female connectors on the mother board 80. Because the soldering is limited to the RF FPC board 48c in the rear of the mother board 80, the optical receiver 50 already placed on the mother board 80 does not interfere the soldering. Note that, the box-shaped housing 42 is still movable on the tabs 46b within a range where the flexibility of the FPC boards, 48a to 48c, allows even after the RF FPC board 48c is soldered with the mother board 80 and the stacking connectors, 49a and 49b, are mated. Because the stacking connectors, 49a and 49b, are provided in the front ends of the respective FPCs, 48a and 48b, the optical receiver 50 also does not interfere the mating of the stacking connectors, 49a and 49b.

Figure 14:
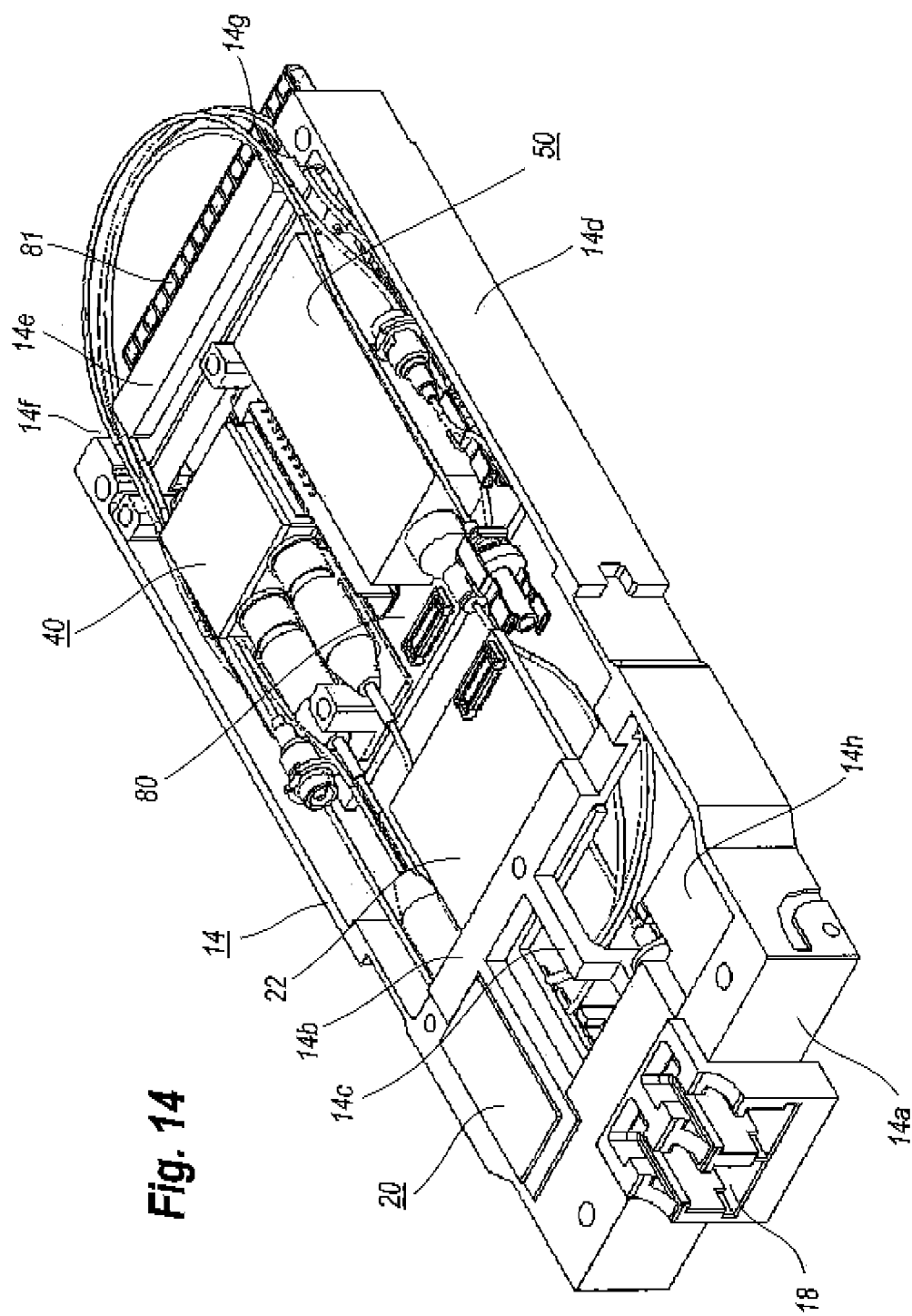
FIG. 14 is a perspective view of the mother board, which mounts the optical modulator and the optical receiver, set within the frame.

The mother board 80 thus mounting the optical modulator 40 and the optical receiver 50 is set within the frame 14, as shown in FIG. 14. The mother board 80 is not screwed with or rigidly fixed to the frame 14 because the mother board 80 is plugged within the plug board 81 in the rear end thereof, and the plug board 81 provides a number of lead pins and the mother board 80 provides a number of terminals electrically coupled with the lead pins. When the mother board 80 is rigidly fixed to the frame 14, stress is unintentionally caused in the coupling between the lead pins and the terminals.

The inner fibers, 40a, 50a, 50b, and 60a, coupling with the optical modulator 40 and the optical receiver 50 are drawn within the frame 14 and the outside thereof as passing through the cuts, 14f and 14g, in the rear wall 14e. Also, the input sleeve 18c attached to the inner fiber 50b extracted from the optical receiver 50 is set in a rear port of the optical receptacle 18.

Figure 15:
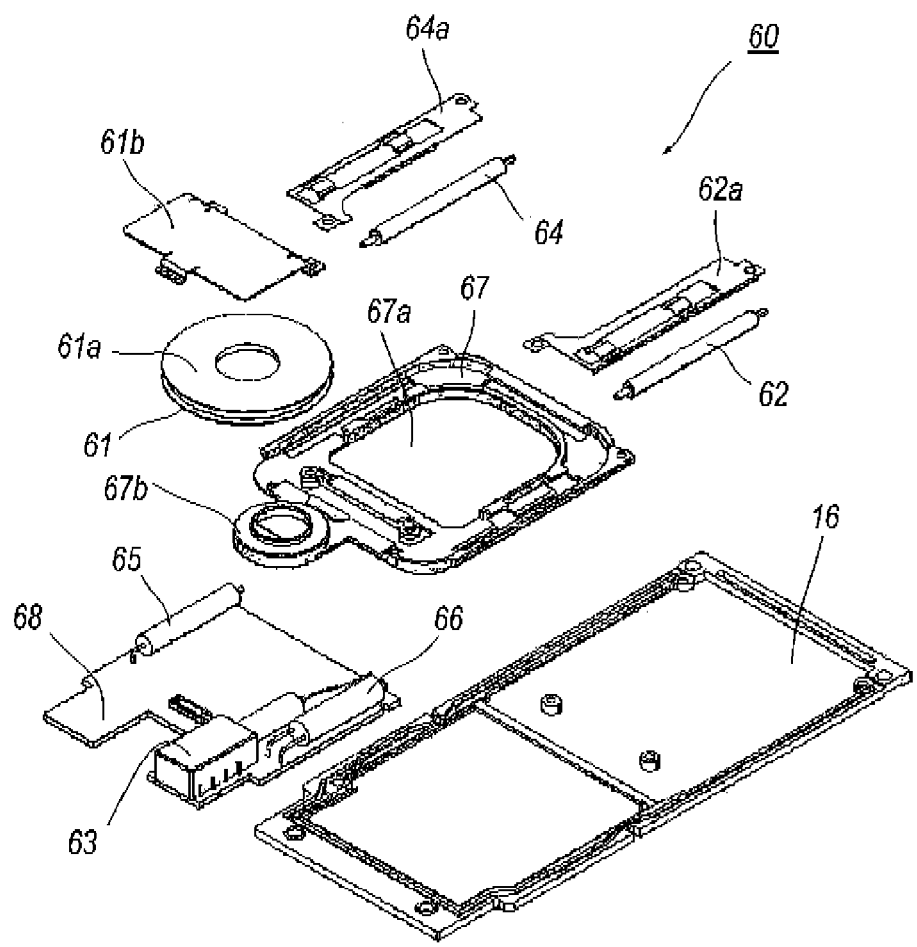
FIG. 15 is an exploded view of the EDFA.

The process next, or independent of the processes above described, assembles the EDFA 60. Referring to FIG. 15, which is an exploded view of the EDFA 60, components implemented in the EDFA 60 is illustrated. The EDFA 60 is assembled on the bottom housing 16. That is, the EDFA circuit board 68, which mounts the pumping source 63, the VOA 65, and the mPD 66 thereon, is set in the front portion of the bottom housing 16, while, the fiber tray 67, which mounts the WSC. 62, the GFF 64, and the EDF 61 wound in the bobbin 61a, is set in the rear portion of the bottom housing 16. The fiber tray 67 provides a front disk 67b to which the bobbin 61a is set.

The assembly of the EDFA 60 first connects those optical components with inner fibers, 60a to 60g, by the fusion splicing not implementing with any optical connectors except for the fourth PMC 70d before the optical components are installed on the bottom housing 16, namely, outside of the optical transceiver 1. Then, as winding excess lengths of the inner fibers, 60a to 60g, around the fiber tray 67, the components of the EDF 61 with the bobbin 61a, the WSC 62, and the OFF 64 are set on the fiber tray 67, and the fiber tray 67 is placed in the rear of the bottom housing 16. Concurrently with the set of the fiber tray 67, the EDF circuit board 68, which mounts the pumping source 63, the VOA 65, and the mPD 66, is set in the front of the bottom housing 16. Covering the WSC 62 with the metal cover 62a, the GFF 64 with the metal cover 64a, and the bobbin 61a with the metal cover 61b, those metal covers, 61b, 62a, and 64a, are screwed to the frame, which automatically fixes the fiber tray 67 to the bottom housing 16. The EDFA circuit board 68 is also screwed to the bottom housing 16. Finally, an EDFA FPC board 83 is mated with the stacking connector provided in a center of the EDFA circuit board 68. The other end of the EDFA FPC board 83 provides a female stacking connector to be coupled with the male stacking connector provided on the back surface of the mother board 80. After assembling the EDFA 60 on the bottom housing 16, the bottom housing 16 is assembled with the frame 14 as setting the sleeve 18d attached to the inner fiber 60b extracted from the mPD 66 in the optical receptacle 18. Thus, the EDFA 60 is completed as shown in FIG. 5.

Finally, the PMS 30 is set on the shelf 14h formed in the side of the optical receptacle 18 of the frame 14. The PMS 30 extracts the inner fibers, 20a, 30a and 30b, each providing in respective other ends the first to third PMCs, 70a to 70c, as illustrated in FIG. 2. One of inner fibers 30 is once pulled out of the frame 14 and backs inside again as passing the cuts, 14f and 14g. Connecting the LD circuit board 22 to the mother board 80 with the LD FPC board 82, the electrical connection between the circuit boards, 80 to 83, may be completed. Finally, the top housing 12 with the rear cover 13 that protects the inner fibers extracted outside of the frame 14 is screwed with the frame 14, and the support 44 of the optical modulator 40 is also screwed with the top housing 12, which securely forms the heat-conducting path from the top of the box-shape housing 42 to the top housing 12 of the optical transceiver 1.

FIG. 16 is an exploded view of the optical receptacle 18 according to another embodiment of the present invention. In the aforementioned optical transceiver 1, the optical receptacle 18 is integrally formed with the frame 14. The optical receptacle 118 has a feature that the optical receptacle 118 is independent of the frame 114. The optical receptacle 118 of the present embodiment includes a holder 118a, a retainer 118b, and shield gaskets, 118c and 118d. Because the optical receptacle 118 is independent of the frame 114, two members of the frame 114 and the optical receptacle 118 form a gap therebetween. The shield gaskets 118c fill the gaps in respective sides of the optical receptacle 114, while, the other shield gasket 118d fills the gap in the bottom of the optical receptacle 118. The frame 114 provides U-shape grooves 114m for setting the former shield gasket 118c therein and a shallow groove 114n. Assembling the top housing 12 with the frame 114, the top housing 12 pushes the optical receptacle 118 downward; and the optical receptacle 118 crushes the shield gasket 118d in the shallow groove 114n, which may tightly shield the optical transceiver 1.

Figure 17A:
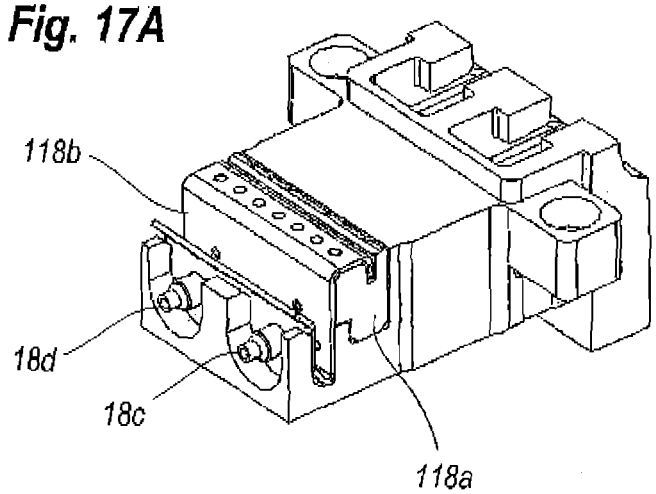
FIG. 17A is a perspective view of the optical receptacle of another embodiment, which is assembled with the sleeves.
Figure 17B:
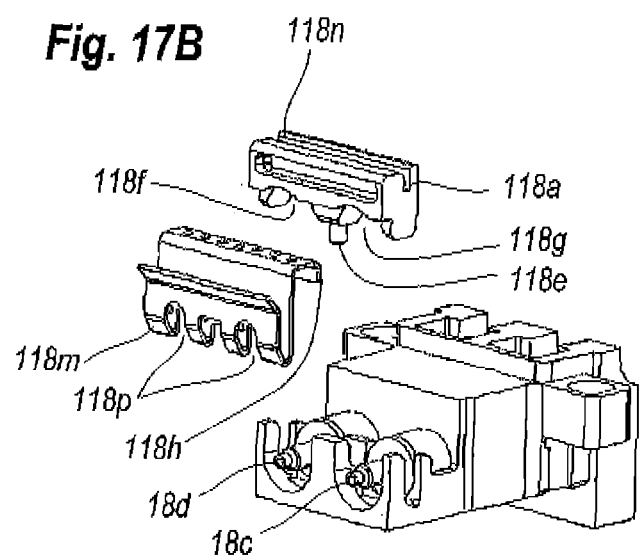
FIG. 17B is an exploded view of the optical receptacle of the second embodiment.

FIG. 17A is a perspective drawing of the optical receptacle 118 assembled with the sleeves, 18c and 18d, viewed from the rear, and FIG. 17B is an exploded view of the optical receptacle 118. The sleeves, 18c and 18d, are set in the optical receptacle 118 as inserting the front portions thereof into ports of the optical receptacle 118. The holder 118a, which has a center pin 118e set into a hole of the optical receptacle 118 and two saddles, 118f and 118g, presses the sleeves, 18a and 18d, downward by being pressed with the top housing 12. Two saddles, 118f and 118g, whose shape traces the outer shape of the sleeves, 18c and 18d, in a thick portion thereof come in contact with the sleeves, 18e and 18d, to securely push the sleeves, 18c and 18d. The retainer 118b, which may be made of bent metal plate, has a front hook 118h and a rear crook 118m. The front hook 118h is set within a groove 118n of the holder 118a, while, the rear crook 118m is set within a gap in the rear portion of the optical receptacle 118. The rear crook 118m provides two side cuts 118n through which the inner fibers, 50b and 60b, pass, and a center cut straddling a center wall provided in the rear gap of the optical receptacle 118. Because the width of the side cuts 18p is narrower than a diameter of the thick portion of the sleeves, 18c and 18d; the rear walls of the thick portion of the sleeves, 18e and 18d, abut against the front surface of the rear crook 118m, and the rear surface of the rear crook 118m abuts against the rearmost wall of the optical receptacle; the holder 118a and the retainer 118b may effectively prevent the sleeves, 18c and 18d, from retreating from the ports of the optical receptacle 118.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An optical transceiver that generates an output optical signal and receives an input optical signal, the optical transceiver comprising:
    an optical source that generates a continuous wave (CW) light;
    an optical splitter that splits the CW light into two portions as maintaining polarization of the CW light;
    an optical modulator that modulates one of the portions of the CW light split by the optical splitter and outputs a modulated optical signal, the optical modulator including a modulating device primarily made of semiconductor materials;
    an optical receiver that interferes the input optical signal with the another of the portions of the CW light split by optical splitter;
    an erbium doped fiber amplifier (EDFA) that outputs the output optical signal by amplifying the modulated optical signal generated by the optical modulator;
    inner fibers that optically couple the optical source, the optical splitter, the optical modulator, the optical receiver, and the EDFA to each other;
    a mother board that mounts the optical modulator and the optical receiver thereon; and
    a housing that encloses the optical source, the optical splitter, the optical modulator, the optical receiver, the EDFA, and the inner fibers therein,
    wherein the housing has dimensions following a CFP2 standard and includes a top housing, a bottom housing, and a frame that is sandwiched between the top housing and the bottom housing, the frame, the top housing, and the bottom housing forming a space where the optical source, the optical splitter, the optical modulator, the optical receiver, the mother board, and the EDFA are enclosed therein,
    wherein the mother board is set in the frame of the housing, the optical modulator is fixed to the top housing, the optical modulator and the optical receiver being arranged in a space formed by the frame, the mother board, and the top housing,
    wherein the EDFA is assembled on the bottom housing and arranged in a space formed by the mother board, the frame and the bottom housing.

2. The optical transceiver of claim 1,
    wherein the optical source is a wavelength tunable optical source including a wavelength tunable laser diode (LD).

3. The optical transceiver of claim 1,
    wherein the inner fibers include polarization maintaining fibers (PMF) for coupling the optical source, the optical splitter, the optical modulator, and the optical receiver.

4. The optical transceiver of claim 1,
    wherein the inner fibers are connected with respective polarization maintaining connectors (PMCs).

5. The optical transceiver of claim 4,
    wherein the inner fibers connecting the optical source with the optical splitter, the optical splitter with the optical modulator, and the optical splitter with the optical receiver provide the respective polarization maintain connectors (PMCs).

6. The optical transceiver of claim 1,
    wherein at least one of the inner fibers is once drawn outside of a housing, bent thereat, and pulled within the housing again.

7. The optical transceiver of claim 6,
    wherein the inner fibers are bent by respective radii greater than 15 mm.

8. The optical transceiver of claim 1,
wherein the housing has dimensions of 91.5 mm in a length, 41.5 mm in a width, and 12.4 mm in a height.

9. The optical transceiver of claim 1,
further comprising an optical receptacle having a port for transmitting the output optical signal and another port for receiving the input optical signal,
wherein the optical receptacle is integrally formed with the frame.

10. The optical transceiver of claim 1,
further comprising an optical receptacle having a port for transmitting the output optical signal and another port for receiving the input optical signal,
wherein the optical receptacle is independent of the frame.

11. The optical transceiver of claim 10,
further comprising a shield gasket that shields a gap formed between the optical receptacle and the frame.

12. The optical transceiver of claim 1,
wherein the EDFA includes an erbium doped fiber (EDF) wound around a bobbin, a pump laser, a coupler, a gain-flattening filter (GFF), a variable optical attenuator (VOA), and a monitor photodiode (mPD), and
wherein the EDF, the pump laser, the GFF, the VOA, and the mPD are mounted on the bottom housing through an EDF circuit board.

* * * * *